(12) United States Patent
Toriumi et al.

(10) Patent No.: US 11,056,701 B2
(45) Date of Patent: Jul. 6, 2021

(54) FUEL CELL SYSTEM

(71) Applicant: TOYOTA JIDOSHA KABUSHIKI KAISHA, Toyota (JP)

(72) Inventors: Keiichi Toriumi, Okazaki (JP); Shunsuke Kawakami, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 17 days.

(21) Appl. No.: 16/802,697

(22) Filed: Feb. 27, 2020

(65) Prior Publication Data

US 2020/0328442 A1 Oct. 15, 2020

(30) Foreign Application Priority Data

Apr. 11, 2019 (JP) .............................. JP2019-075565

(51) Int. Cl.
*H01M 8/04992* (2016.01)
*H01M 8/04858* (2016.01)
*H01M 8/04746* (2016.01)
*H01M 8/04082* (2016.01)
*H01M 8/04537* (2016.01)

(52) U.S. Cl.
CPC ... *H01M 8/04992* (2013.01); *H01M 8/04201* (2013.01); *H01M 8/04641* (2013.01); *H01M 8/04753* (2013.01); *H01M 8/04873* (2013.01); *H01M 8/04932* (2013.01); *H01M 2250/20* (2013.01)

(58) Field of Classification Search
CPC ......... H01M 8/04201; H01M 8/04552; H01M 8/04641; H01M 8/04753; H01M 8/04873; H01M 8/04932; H01M 8/04992; H01M 2250/20; Y02E 60/50; Y02T 90/40
See application file for complete search history.

(56) References Cited

U.S. PATENT DOCUMENTS

2010/0261084 A1* 10/2010 Yoshida ............ H01M 8/04186
429/432
2016/0141682 A1 5/2016 Yamanaka et al.

FOREIGN PATENT DOCUMENTS

| JP | 2009110848 A | | 5/2009 |
|---|---|---|---|
| JP | 2013-176178 | * | 9/2013 |
| JP | 2013176178 A | | 9/2013 |

(Continued)

*Primary Examiner* — Brittany L Raymond
(74) *Attorney, Agent, or Firm* — Dickinson Wright, PLLC

(57) ABSTRACT

A fuel cell system, including: an electric power generation control unit; an insulation-resistance measurement signal generation unit configured to generate a voltage-divided AC signal obtained by dividing an amplitude of a measurement AC signal; and an insulation resistance measurement unit configured to measure a resistance value of the insulation resistance, in which when the insulation resistance measurement unit detects, in a state where a voltage is maintained during an intermittent operation of the electric power generation control unit, an excessive noise state indicating a change in which a range of fluctuations of the peak value of the voltage-divided AC signal exceeds a predetermined allowable range of fluctuations, the insulation resistance measurement unit instructs the electric power generation control unit to change a fluctuation frequency of an output voltage of the fuel cell from a current frequency and then measures the resistance value of the insulation resistance.

4 Claims, 4 Drawing Sheets

(56) References Cited

FOREIGN PATENT DOCUMENTS

| JP | 2016096087 A | 5/2016 |
|----|--------------|--------|
| JP | 2017083388 A | 5/2017 |

* cited by examiner

FUEL CELL SYSTEM

CROSS REFERENCE TO RELATED APPLICATIONS

This application is based upon and claims the benefit of priority from Japanese patent application No. 2019-075565, filed on Apr. 11, 2019, the disclosure of which is incorporated herein in its entirety by reference.

BACKGROUND

The present disclosure relates to a fuel cell system that performs a voltage maintenance control for maintaining an open circuit voltage of a fuel cell at a target voltage by increasing or reducing the amount of oxygen supplied to the fuel cell.

In a vehicle with a fuel cell mounted thereon, an intermittent operation mode is set so that the efficiency of a fuel cell system is prevented from being reduced when the load required for the fuel cell is low. An intermittent operation is a mode of stopping generation of electric power of a fuel cell and supplying electric power only using a secondary battery. During such an intermittent operation, while the efficiency of generation of electric power of the fuel cell is prevented from being reduced, a voltage maintenance control may be performed in which an open circuit voltage of the fuel cell is maintained near the target voltage so that the durability of the fuel cell is prevented from being reduced. Japanese Unexamined Patent Application Publication No. 2016-96087 discloses an example of the technique related to such a voltage maintenance control.

Japanese Unexamined Patent Application Publication No. 2016-96087 discloses a voltage control method for a fuel cell in a fuel cell system including a fuel cell that supplies electric power with respect to a load. In Japanese Unexamined Patent Application Publication No. 2016-96087, in an ordinary load state in which electric power required by a load exceeds a predetermined reference value, at least some of the required electric power is supplied from a fuel cell, and in a low load state in which the required electric power is below the reference value, the fuel cell is electrically disconnected from the load, and oxygen is supplied to the fuel cell under predetermined conditions in order to set an open circuit voltage of the fuel cell to a predetermined target voltage. Then, the open circuit voltage is compared with the target voltage. If the compared open circuit voltage is higher than the target voltage by a first value or larger, the amount of oxygen supplied to the fuel cell is reduced, if the compared open circuit voltage is lower than the target voltage by a second value or larger, the amount of oxygen supplied to the fuel cell is increased, and in a case in which neither of the above two cases apply, the amount of oxygen supplied to the fuel cell is maintained, whereby it is possible to maintain the open circuit voltage of the fuel cell near the target voltage without causing the fuel cell to generate electric power.

SUMMARY

In a vehicle with a fuel cell mounted thereon, a load circuit (e.g., a motor, a compressor) is operated by electric power supplied from a power source including the fuel cell, so that it is necessary to maintain a high insulation resistance between a high voltage circuit constituting a path for this electric power supply and a conductor installed around the high voltage circuit. This is because a reduction in the resistance value of the insulation resistance would bring about a state in which leakage of electricity from the high voltage circuit occurs, which is a problem. Therefore, an insulation resistance measurement circuit that measures the resistance value of an insulation resistance is provided in such a fuel cell system. Examples of such an insulation resistance measuring circuit include an insulation resistance measurement circuit that measures the resistance value of the insulation resistance based on the peak value of a voltage-divided AC signal obtained by dividing the amplitude of an AC signal for measurement (hereinafter also referred to as a measurement AC signal) using a resistance voltage divided by the reference resistance having a known resistance value and the insulation resistance.

However, performing a voltage maintenance control as in the case of the fuel cell system disclosed in Japanese Unexamined Patent Application Publication No. 2016-96087 causes a problem that the fluctuations of the fuel cell voltage due to the voltage maintenance control become noises, thereby reducing the accuracy of measurement of the insulation resistance.

The present disclosure has been made to solve the above-described problems, and an object thereof is to prevent the accuracy of measurement of an insulation resistance from being reduced due to a voltage maintenance control of a fuel cell.

A first exemplary aspect is a fuel cell system, including: a fuel cell; an electric power generation control unit configured to control an amount of electric power generated by the fuel cell by controlling an amount of oxidant gas and fuel gas supplied to the fuel cell; an insulation-resistance measurement signal generation unit configured to generate a voltage-divided AC signal obtained by dividing an amplitude of a measurement AC signal using a resistance voltage divided by an insulation resistance between an outer conductor located around a high voltage circuit including the fuel cell and the high voltage circuit, and a reference resistance having a known resistance value; and an insulation resistance measurement unit configured to measure a resistance value of the insulation resistance based on a peak value of the voltage-divided AC signal, in which when the insulation resistance measurement unit detects, in a state where a voltage is maintained during an intermittent operation of the electric power generation control unit, an excessive noise state indicating a change in which a range of fluctuations of the peak value of the voltage-divided AC signal exceeds a predetermined allowable range of fluctuations, the insulation resistance measurement unit instructs the electric power generation control unit to change a fluctuation frequency of an output voltage of the fuel cell from a current frequency and then measures the resistance value of the insulation resistance.

The fuel cell system according to the present disclosure prevents, when an excessive noise state occurs in which a noise component superimposed on the voltage-divided AC signal used for measuring the resistance value of the insulation resistance increases, an amplitude deviation of the voltage-divided AC signal due to the noise component superimposed on the voltage-divided AC signal by changing the fluctuation frequency of the fuel cell voltage.

According to the present disclosure, it is possible to increase the accuracy of measurement of the resistance value of the insulation resistance regardless of whether or not there is voltage maintenance control of the fuel cell.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
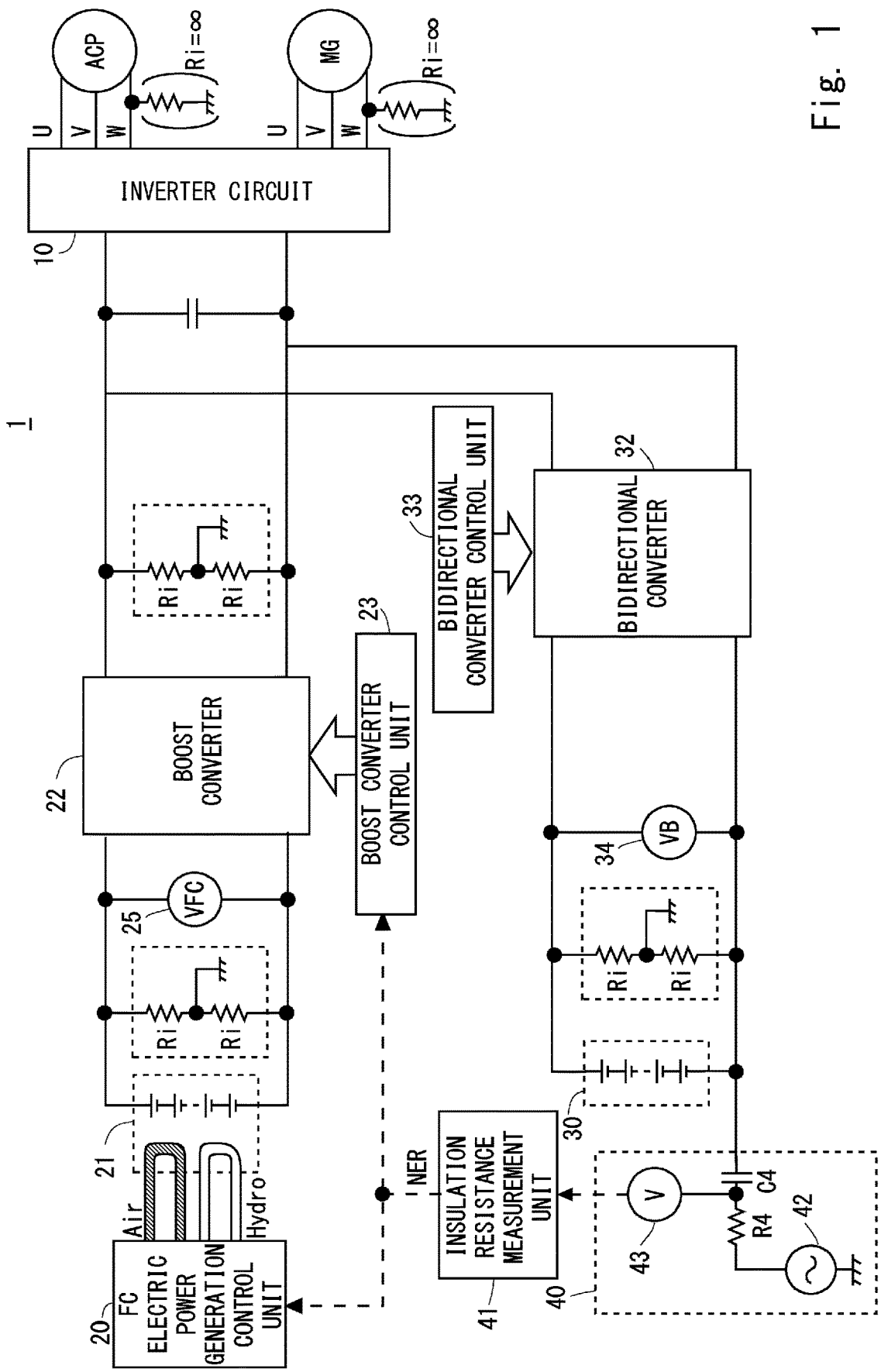
FIG. 1 is a block diagram of a fuel cell system according to a first embodiment.

For the clarification of the explanation, the following descriptions and the drawings are omitted and simplified as appropriate. Further, each element shown in the drawings as functional blocks that perform various processing can be formed of a Central Processing Unit (CPU), a memory, and other circuits in hardware and may be implemented by programs loaded into the memory in software. Those skilled in the art will therefore understand that these functional blocks may be implemented in various ways by only hardware, only software, or the combination thereof without any limitation. Note that throughout the drawings, the same elements are denoted by the same reference signs and duplicate descriptions are omitted as appropriate.

Further, the above-described program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

First Embodiment

First, FIG. 1 shows a block diagram of a fuel cell system 1 according to a first embodiment. As shown in FIG. 1, the fuel cell system 1 according to the first embodiment is a system that drives a motor MG and an air compressor ACP by electric power generated by a fuel cell 21 and electric power output from a secondary battery 30. Further, the fuel cell system 1 according to the first embodiment charges the secondary battery 30 with excess electric power from the electric power generated by the fuel cell 21 and electric power generated by the regenerative operation of the motor MG. Further, in the fuel cell system 1, an inverter circuit 10 drives the air compressor ACP and the motor MG based on the electric power supplied from at least one of the fuel cell 21 and the secondary battery 30.

The fuel cell system 1 according to the first embodiment includes, as a high voltage circuit including the fuel cell 21, an electric power generation control unit (e.g., an FC electric power generation control unit 20), a boost converter 22, a boost converter control unit 23, and a voltmeter 25. The fuel cell system 1 includes, as a high voltage circuit including the secondary battery 30, a bidirectional converter 32, a bidirectional converter control unit 33, and a voltmeter 34. Further, the fuel cell system 1 includes the inverter circuit 10, an insulation-resistance measurement signal generation unit 40, and an insulation resistance measurement unit 41.

The fuel cell 21 is a battery that generates electric power by reacting fuel gas (e.g., hydrogen indicated as Hydro in FIG. 1) with oxidant gas (e.g., oxygen indicated as Air in FIG. 1). The FC electric power generation control unit 20 controls the amount of electric power generated by the fuel cell 21 by adjusting the flow rates of fuel gas and oxidant gas supplied to the fuel cell 21. The boost converter 22 boosts an output voltage (a fuel cell voltage VFC) of the fuel cell 21 and outputs a high voltage VH. The boost converter control unit 23 controls the output capacity of the boost converter 22. The voltmeter 25 measures a voltage value of the fuel cell voltage VFC and notifies the FC electric power generation control unit 20 about the voltage value thereof. Note that in FIG. 1, the communication path through which the voltmeter 25 notifies the voltage value of the fuel cell voltage VFC is omitted.

The secondary battery 30 is a chargeable and dischargeable battery such as a nickel metal hydride battery and a lithium ion battery. The voltage of electric power supplied from the secondary battery 30 is indicated as a battery voltage VB. In a discharge mode, the bidirectional converter 32 boosts the battery voltage VB and outputs it as a high voltage. Further, in a charge mode, the bidirectional converter 32 outputs the battery voltage VB obtained by stepping down the high voltage. The bidirectional converter control unit 33 controls whether to operate the bidirectional converter 32 in the discharge mode or the charge mode and controls the output capacity of the bidirectional converter 32.

The insulation-resistance measurement signal generation unit 40 includes an AC signal generation unit 42, a peak value measurement unit 43, a reference resistance R4, and a coupling capacitor C4. The AC signal generation unit 42 outputs a measurement AC signal. The reference resistance R4 is connected in series to the output of the AC signal generation unit 42. The coupling capacitor C4 is inserted between the reference resistance R4 and the wiring on the negative electrode side. The peak value measurement unit 43 measures the peak value of the voltage-divided AC signal generated between the reference resistance R4 and the coupling capacitor C4, and transmits the measured peak value to the insulation resistance measurement unit 41. Note that using the coupling capacitor C4 isolates the insulation-resistance measurement signal generation unit 40 from the wiring on the negative electrode side in a direct current manner and brings the insulation-resistance measurement signal generation unit 40 and the wiring on the negative electrode side into a conductive state in an alternating current manner. By this configuration, in the insulation resistance measurement unit 41, only the voltage of an alternating current signal is divided by an insulation resistance Ri and the reference resistance R4.

That is, the insulation-resistance measurement signal generation unit 40 generates a voltage-divided AC signal obtained by dividing the amplitude of a measurement AC signal using the resistance voltage divided by the insulation resistance Ri between an outer conductor located around a high voltage circuit including the fuel cell 21 and the high voltage circuit and a reference resistance R4 having a known resistance value.

The insulation resistance measurement unit 41 measures the resistance value of the insulation resistance Ri based on the peak value of the voltage-divided AC signal. Further, when the insulation resistance measurement unit 41 detects, in a state where a voltage is maintained during an intermittent operation of the FC electric power generation control unit 20, an excessive noise state indicating a change that a range of fluctuations of the peak value of the voltage-divided AC signal exceeds a predetermined allowable range of fluctuations, the insulation resistance measurement unit 41 outputs a noise suppression instruction signal NER that instructs the FC electric power generation control unit 20 to change the fluctuation frequency of the output voltage (e.g., the fuel cell voltage VFC) of the fuel cell 21 from the current frequency. Then, the insulation resistance measurement unit 41 measures the resistance value of the insulation resistance Ri after the FC electric power generation control unit 20 changes the cycle of fluctuations of the fuel cell voltage VFC output from the secondary battery 30.

Further, as shown in FIG. 1, in the fuel cell system 1 according to the first embodiment, the insulation resistance Ri occurs between the fuel cell 21, the secondary battery 30, the high voltage circuits, the air compressor ACP, and the motor MG, and the outer conductor located outside the fuel cell system 1. In the example shown in FIG. 1, an insulation resistance occurs between the wiring on the positive electrode side and the wiring on the negative electrode side, and the chassis ground. Further, the insulation resistance Ri also occurs between the W-phase wiring among the wirings that drive the motor MG and the air compressor ACP, and the chassis ground. This insulation resistance Ri is not provided as a resistance part, but is instead an electrical resistance component generated due to, for example, an insulating member covering the wiring or a space generated between the wiring and the outer conductor. Further, the insulation resistance Ri ideally has an infinite resistance value. However, the resistance value of the insulation resistance Ri may be reduced due to, for example, damage to the insulating film of the wiring on the negative electrode side. When such a reduction in the resistance value of the insulation resistance Ri occurs, a leakage of electricity occurs in the fuel cell system 1 and accordingly it is necessary to do repairs or the like. Therefore, in the fuel cell system 1, the insulation-resistance measurement signal generation unit 40 and the insulation resistance measurement unit 41 measure the resistance value of the insulation resistance Ri, and if a reduction in the resistance value of the insulation resistance Ri is found, they notify a user via a host system that a reduction in the resistance value has been found.

Next, the operation during an intermittent operation in the fuel cell system 1 according to the first embodiment is described. The intermittent operation optimizes the capacity of supply of electric power of the entire system by stopping electric power generation of the fuel cell 21 and supplying electric power only using the secondary battery during the period when the load required by the air compressor ACP and the motor MG is low. During the intermittent operation, a voltage control is performed to maintain the open circuit voltage of the fuel cell near the target voltage by adjusting the amount of supply of oxygen so that the durability of the fuel cell is prevented from being reduced while preventing the efficiency of generation of electric power of the fuel cell from being reduced.

Figure 2:
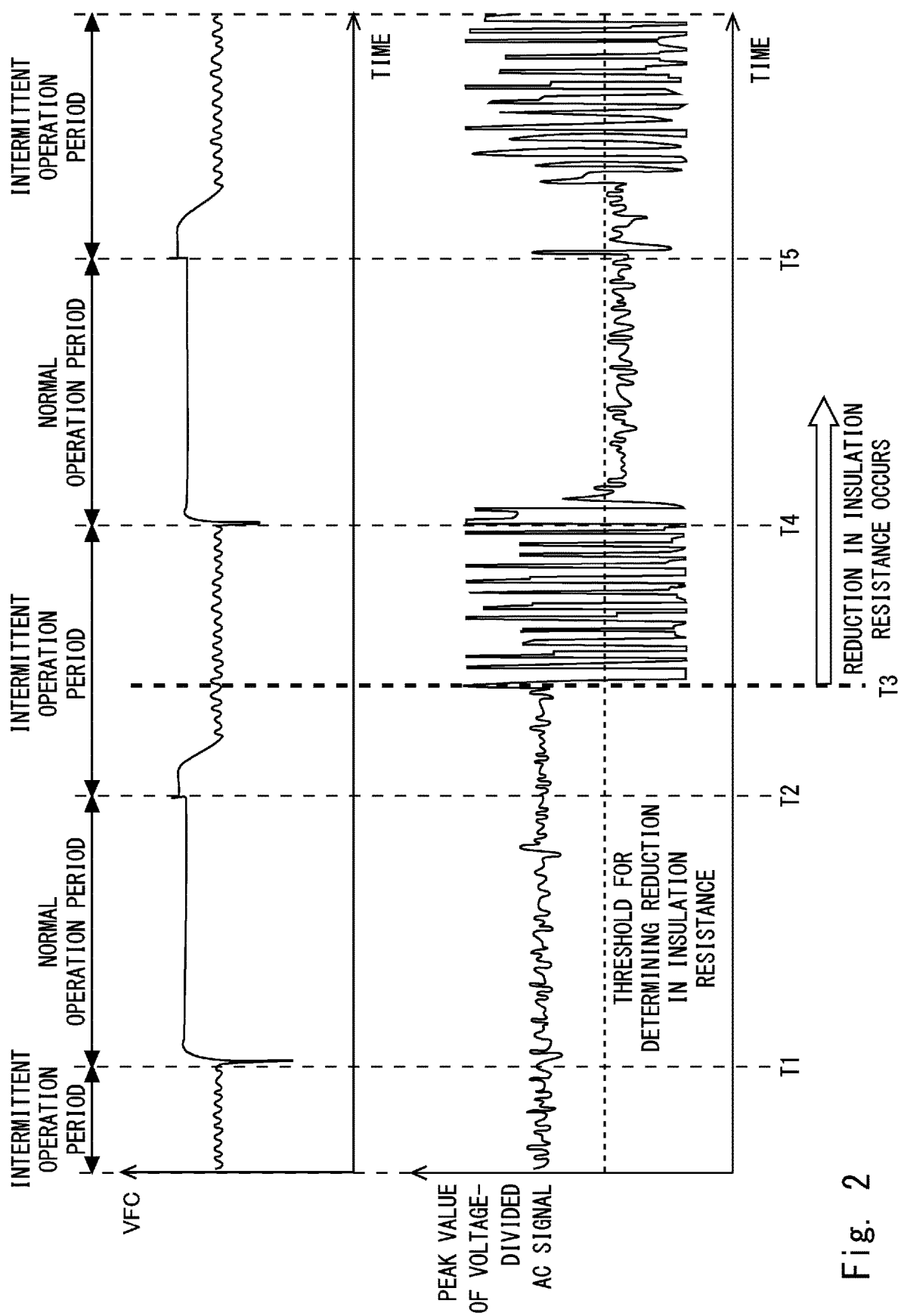
FIG. 2 is a timing chart for explaining fluctuations in a peak value of a voltage-divided AC signal when an insulation resistance is reduced during normal generation of electric power and an intermittent operation in the fuel cell system according to the first embodiment.

FIG. 2 shows a timing chart for explaining fluctuations in the peak value of a voltage-divided AC signal when the insulation resistance is reduced during a normal generation of electric power and an intermittent operation in the fuel cell system according to the first embodiment. The timing chart shown in FIG. 2 shows the change in the fuel cell voltage VFC of the fuel cell over time and the change in the peak value of the voltage-divided AC signal output from the insulation resistance-measurement signal generation unit 40 over time during a normal generation of electric power and an intermittent operation.

In the example shown in FIG. 2, a period of a normal generation of electric power (timings T1 to T2, and T4 to T5) and a period of an intermittent operation (before the timing T1, the timing T2 to T4, and after the timing T5) are repeated. The period of a normal generation of electric power is a period in which the FC power generation control unit 20 causes the fuel cell 21 to perform a normal generation of electric power by supplying fuel gas and oxidant gas to the fuel cell 21. In the period of an intermittent operation, the fuel cell is electrically disconnected from the load, and the FC electric power generation control unit 20 basically stops supplying fuel gas and oxidant gas to the fuel cell 21, unlike in the operation of a normal generation of electric power. Accordingly, in a period in which the voltage maintenance is controlled, the fuel cell voltage VFC is lower than that in a period in which the voltage maintenance is not controlled. However, if supply of fuel gas and oxidant gas to the fuel cell 21 remains stopped during the period in which the voltage maintenance is controlled, the fuel cell voltage VFC is greatly reduced, which leads to a problem that the efficiency of generation of electric power of the fuel cell 21 and the lifetime thereof are reduced. Therefore, during the period in which the voltage maintenance is controlled, while the flow rates of fuel gas and oxidant gas supplied to the fuel cell 21 by the FC electric power generation control unit 20 are reduced, the flow rates of the gases are controlled so that the fuel cell voltage VFC is maintained near a predetermined target voltage. Accordingly, the fuel cell voltage VFC periodically fluctuates during the period in which the voltage maintenance is controlled.

Next, the change in the peak value of the voltage-divided AC signal over time is described. If the resistance value of the insulation resistance Ri does not change, the range of fluctuations of the peak value of the voltage-divided AC signal does not change substantially between the period of a normal generation of electric power and the period of an intermittent operation. However, when the resistance value of the insulation resistance Ri is reduced (e.g., after the timing T3) and a voltage change frequency of the fuel cell voltage VFC due to the voltage maintenance control during the intermittent operation approaches the frequency of the measurement AC signal output by the AC signal generation unit 42, the range of fluctuations of the peak value of the voltage-divided AC signal is clearly larger than that before the resistance value of the insulation resistance Ri is reduced (e.g., the timings T3 to T4). When the range of fluctuations of the peak value of the voltage-divided AC signal exceeds a predetermined allowable range of fluctuations as described above, the insulation resistance measurement unit 41 determines that an excessive noise state has occurred. Further, in the fuel cell system 1 according to the first embodiment, when such an excessive noise state occurs, the cycle of fluctuations of the fuel cell voltage VFC is changed by changing the method for controlling the fuel cell 21 in the voltage maintenance control, thereby eliminating the excessive noise state. Therefore, a process for measuring an insulation resistance value in the fuel cell system 1 according to the first embodiment is described below.

Figure 3:
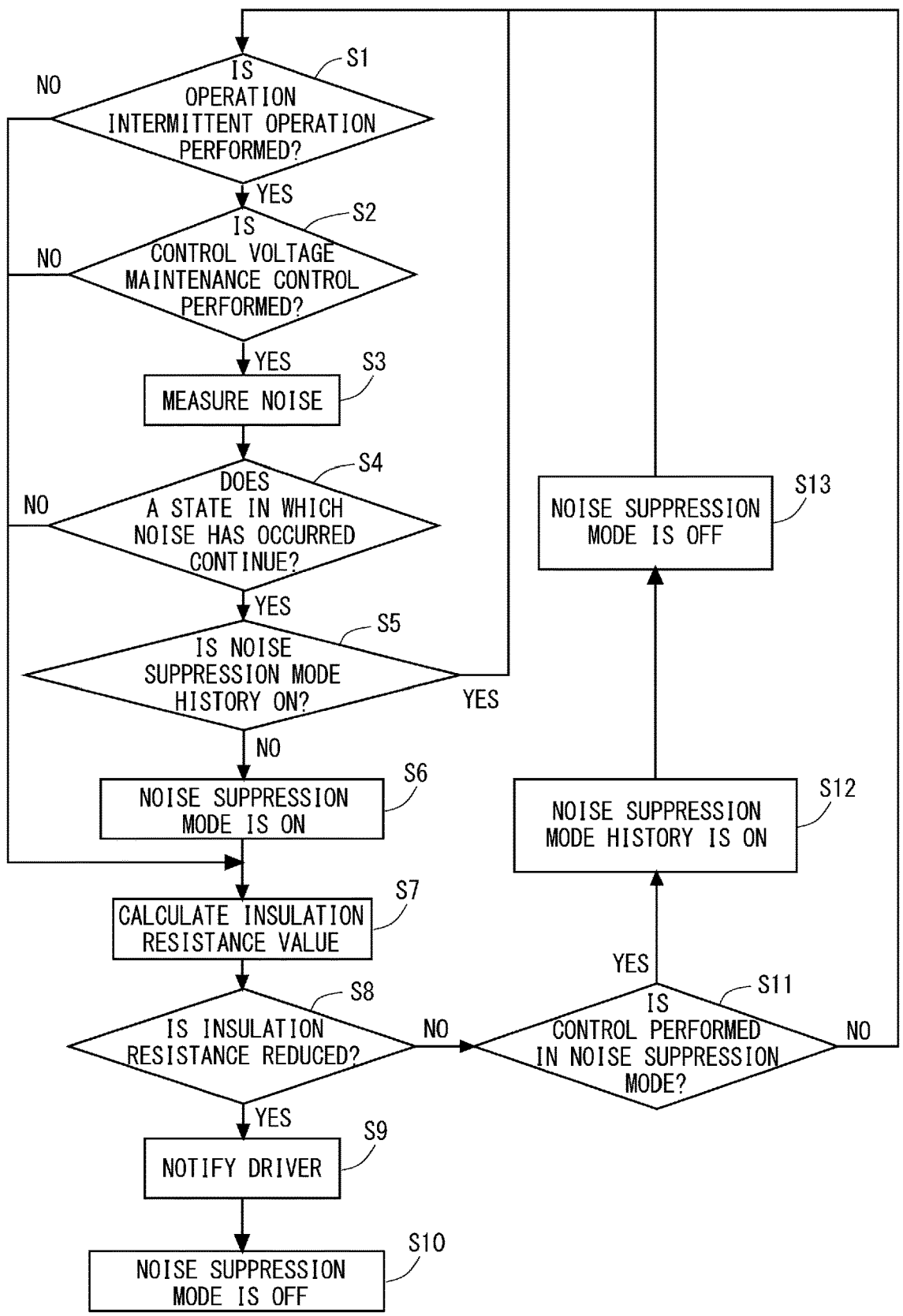
FIG. 3 is a flowchart for explaining a process for measuring an insulation resistance value in the fuel cell system according to the first embodiment.

FIG. 3 shows a flowchart for explaining the process for measuring an insulation resistance value in the fuel cell system according to the first embodiment. The flowchart in FIG. 3 shows one of a plurality of processes performed in the fuel cell system 1. This process is a process for measuring a noise that is repeatedly performed in accordance with a predetermined cycle of measurement of the insulation resistance value.

As shown in FIG. 3, in the fuel cell system 1, when the process for measuring a noise is performed, it is first determined whether or not the current operation state of the fuel cell 21 is in an intermittent operation state (Step S1). In Step S1 for determining whether the current operation state is in an intermittent operation state, if it is determined that the operation state of the fuel cell 21 is in a normal operation state (NO in Step S1), in the fuel cell system 1, the insulation resistance measurement unit 41 calculates the resistance value of the insulation resistance Ri based on the peak value of the voltage-divided AC signal (Step S7). Then, in Step S7 for calculating a resistance value, if it is determined that the resistance value of the insulation resistance Ri is not reduced, it is determined whether or not the current noise measurement mode is a noise suppression mode (Steps S8 and S11). In Step S11 for determining whether the current noise measurement mode is a noise suppression mode, if it is determined that the control is not performed in the noise suppression mode (NO in Step S11), the process returns to Step S1 for determining whether the current operation state is in an intermittent operation state. If it is determined in Step S1 that the operating state of the fuel cell 21 is in a normal operation state, the process can only proceed to NO in Step S11, and therefore the process performed in a case of YES in Step S11 will be described later.

In Step S1 for determining whether the current operation state is in an intermittent operation state, if it is determined that the operation state of the fuel cell 21 is in an intermittent operation state (YES in Step S1), it is determined whether or not the current control state of the fuel cell 21 is in a voltage maintenance control state (Step S2). In Step S2 for determining whether the current control state is in a voltage maintenance control state, if it is determined that the current control state is not in a voltage maintenance control state (NO in Step S2), the process proceeds to Step S7 for calculating a resistance value as in the case of a normal operation (the case in which the process proceeds to NO in Step S1). On the other hand, in Step S2 for determining whether the current control state is in a voltage maintenance control state, if it is determined that the current control state is in a voltage maintenance control state (YES in Step S2), the insulation resistance measurement unit 41 measures the noise of the peak value of the voltage-divided AC signal (Step S3). Then, the insulation resistance measurement unit 41 determines whether or not a state in which a noise has occurred continues for a period equal to or greater than a predetermined period threshold of a noise determination (Step S4). In Step S4 for determining a period of continuation of a state in which a noise has occurred, if it is determined that an excessive noise state continues only for a period shorter than the period threshold of the noise determination (NO in Step S4), the process proceeds to Step S7 for calculating a resistance value. On the other hand, in Step S4 for determining a period of continuation of a state in which a noise has occurred, if it is determined that an excessive noise state continues for a period longer than the period threshold of the noise determination (YES in Step S4), the insulation resistance measurement unit 41 refers to history information of the control in the noise suppression mode stored in the insulation resistance measurement unit 41 and determines whether or not the resistance value of the insulation resistance Ri has been calculated in the noise suppression mode in the past (Step S5).

In Step S5 for determining a history of the control in the noise suppression mode, if the resistance value of the insulation resistance Ri has been calculated in the noise suppression mode in the past (YES in Step S5), the insulation resistance measurement unit 41 returns to Step S1 for determining whether the current operation state is in an intermittent operation state and waits the timing for the next measurement. On the other hand, in Step S5 for determining a history of the control in the noise suppression mode, if the resistance value of the insulation resistance Ri has been not calculated in the noise suppression mode in the past (NO in Step S5), the insulation resistance measurement unit 41 switches the voltage maintenance control of the fuel cell 21 to the control in the noise suppression mode (Step S6). In Step S6, the insulation resistance measurement unit 41 outputs the noise suppression instruction signal NER to the FC electric power generation control unit 20 and the boost converter control unit 23, and instructs the FC electric power generation control unit 20 to switch its operation to the operation in the noise suppression mode. By doing so, the cycle of fluctuations of the fuel cell voltage VFC is changed from the current cycle.

Then, if it is determined that the resistance value of the insulation resistance Ri calculated in Step S7 for calculating the resistance value is a threshold for determining a reduction in the insulation resistance or lower (YES in Step S8), the insulation resistance measurement unit 41 notifies a driver that the insulation resistance is reduced via a host system (not shown) (Step S9), and turns off the noise suppression mode (Step S10). On the other hand, if it is determined that the resistance value of the insulation resistance Ri calculated in Step S7 for calculating the resistance value is greater than the threshold for determining a reduction in the insulation resistance (NO in Step S8), it is determined whether or not the current noise measurement mode is a noise suppression mode (Step S11).

In Step S11 for determining whether the current noise measurement mode is a noise suppression mode, if it is determined that the control is not performed in the noise suppression mode (NO in Step S11), the process returns to Step S1 for determining whether the current operation state is in an intermittent operation state. On the other hand, in Step S11 for determining whether the current noise measurement mode is a noise suppression mode, if it is determined that the control is performed in the noise suppression mode (YES in Step S11), the insulation resistance measurement unit 41 starts history processing of the noise suppression mode (Step S12) and turns off the noise suppression mode (Step S13), and then the process returns to Step S1.

Note that it is preferred that the history information of the noise suppression mode be cleared when, for example, the ignition switch is turned off or after a predetermined period has elapsed. Further, the timing for clearing the history information of the noise suppression mode is determined while the tendency of noises superimposed on the fuel cell system 1 to too easily occur, the efficiency and the durability of the fuel cell 21, the frequency of measurement of the insulation resistance, and the like are taken into consideration.

Step S4 for determining a period of continuation of a state in which a noise has occurred is described in detail below. A plurality of methods can be used for a determination made in the process for determining a period of continuation of a state in which a noise has occurred.

In a first determination method, it is determined that a state in which the peak value of the voltage-divided AC signal is greater than a predetermined upper-limit threshold of noises, or a state in which the peak value of the voltage-divided AC signal is smaller than a predetermined lower-limit threshold of noises is a state in which a noise has occurred. Then, the number of times that it is determined a noise has occurred is counted, and if the number of such times within a certain period exceeds the threshold number, it is determined that a noise is continuously present.

In a second determination method, if the deviation between the peak value of the voltage-divided AC signal and the time average of the peak values thereof is larger than a predetermined threshold, it is determined that a noise has occurred. The number of times that it is determined a noise has occurred is counted, and if the number of such times within a certain period exceeds the threshold number, it is determined that a noise is continuously present.

Further, a method for controlling the fuel cell 21 in a noise suppression mode is described in detail. In the noise suppression mode, it is sufficient that it be possible for the cycle of voltage fluctuations of the fuel cell voltage VFC to be shifted from the current cycle, and a plurality of methods can be used for this change of the cycle of voltage fluctuations.

In a control method in a first noise suppression mode, generation of electric power by the fuel cell 21 is stopped by stopping supply of gas to the fuel cell 21 by the FC electric power generation control unit 20. In a control method in a second noise suppression mode, a small amount of electric power is generated regardless of whether or not an intermittent operation is being performed. In the second noise suppression mode, the secondary battery 30 is charged with the generated electric power. By doing so, the voltage fluctuations of the fuel cell voltage VFC are reduced to a level close to those in a normal operation. In a control method in a third noise suppression mode, supply of gas to the fuel cell 21 by the FC electric power generation control unit 20 is performed using more than the electric power generation capacity of the fuel cell 21, resulting in an excessive supply of fuel. In the control method in the third noise suppression mode, the fuel cell voltage VFC output from the fuel cell 21 is maintained at a high voltage, and accordingly the voltage fluctuations of the fuel cell voltage VFC at a low frequency are prevented. In a control method in a fourth noise suppression mode, the range of the target voltage in a voltage maintenance control is narrowed, or is widened. By the control method in the fourth noise suppression mode, the cycle of fluctuations of the fuel cell voltage VFC becomes shorter or longer by changing the range of the target voltage, which is the range of fluctuations of the fuel cell voltage VFC. This suppresses noises superimposed on the voltage-divided AC signal, because the cycle of the measurement AC signal output from the AC signal generation unit 42 is shifted from the cycle of fluctuations of the fuel cell voltage VFC.

As described above, the fuel cell system 1 according to the first embodiment changes the cycle of fluctuations of the fuel cell voltage VFC from the current cycle by performing the voltage maintenance control in the noise suppression mode when noises due to the voltage maintenance control are superimposed on the voltage-divided AC signal used for calculation of the resistance value of the insulation resistance Ri. Thus, in the fuel cell system 1, it is possible to suppress the magnitude of noises superimposed on a voltage-divided AC signal, thereby enabling the accuracy of calculation of the resistance value of the insulation resistance Ri in a voltage maintenance control to be increased.

Further, in the fuel cell system 1 according to the first embodiment, it is possible to measure the resistance value of the insulation resistance Ri with high accuracy even during a voltage maintenance control, thereby enabling the frequency of measurement of the insulation resistance Ri to be determined regardless of whether or not there is voltage maintenance control.

Further, in the fuel cell system 1 according to the first embodiment, as the cycle of fluctuations of the fuel cell voltage VFC is changed in the noise suppression mode only when noises superimposed on the voltage-divided AC signal become large, it is possible to reduce the influence of the change on the efficiency of generation of electric power of the fuel cell 21 and the durability thereof.

Second Embodiment

Figure 4:
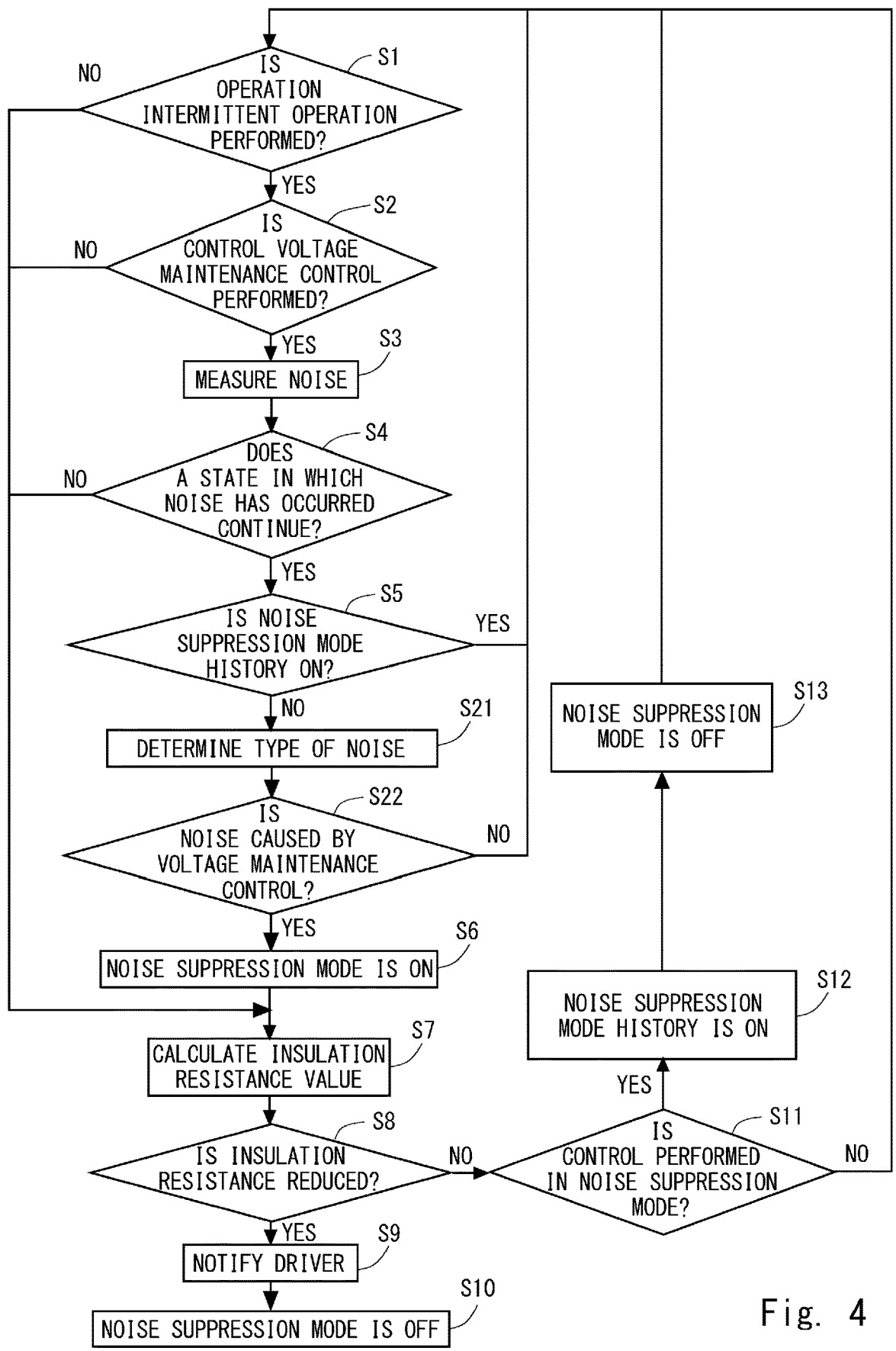
FIG. 4 is a flowchart for explaining a process for measuring an insulation resistance value in the fuel cell system according to a second embodiment.

In a second embodiment, another example of the process for measuring an insulation resistance value shown in FIG. 3 is described. Note that the components described in the first embodiment are denoted by the same reference symbols as those in the first embodiment, and the description thereof will be omitted. FIG. 4 is a flowchart for explaining a process for measuring an insulation resistance value in the fuel cell system according to the second embodiment.

As shown in FIG. 4, the process for measurement described in the second embodiment is the same as that in the flowchart described in FIG. 3 except that Steps S21 and S22 are added. Step S21 is performed when it is determined in Step S5 for determining whether the current noise measurement mode is a noise suppression mode that the current noise measurement mode is not a noise suppression mode (NO in Step S5). In Step S21, the type of the noise superimposed on the voltage-divided AC signal is determined. Specifically, in Step S21, it is determined whether or not the noise is caused by the voltage maintenance control. If it is determined in the determination process of Step S21 that the noise is caused by the voltage maintenance control (YES in Step S22), Step S4 for switching to a noise suppression mode is performed. On the other hand, if it is determined in the determination process of Step S21 that the noise is not caused by the voltage maintenance control (NO in Step S22), the insulation resistance measurement unit 41 does not instruct the FC electric power generation control unit 20 and the boost converter control unit 23 to switch to a noise suppression mode and instead returns to Step S1 for determining whether the current operation state is in an intermittent operation state and waits the timing for the next measurement.

A method for determining the type of noise is described below. A plurality of methods can be used for determining the type of noise. A first method for determining the type of noise is a method for comparing the number of occurrences of noises per hour before the voltage maintenance control is performed with the number after the voltage maintenance control is performed. If the number of occurrences of noises per hour before the voltage maintenance control is performed is significantly different from the number after the voltage maintenance is performed, it can be determined that the noises are caused by the voltage maintenance control.

A second method for determining the type of noise is a method for comparing the cycle of generation of noises in which it is determined that noises have occurred during the voltage maintenance control with the cycle of fluctuations of the fuel cell voltage VFC. If the cycle of generation of noises in which it is determined that noises have occurred during the voltage maintenance control and the cycle of fluctuations of the fuel cell voltage VFC are within a certain range of each other, it can be determined that the noises are caused by voltage maintenance control.

A third method for determining the type of noise is a method for comparing the cycle of fluctuations of the fuel cell voltage VFC with the cycle of the measurement AC signal output from the AC signal generation unit 42. It should be noted that the cycle of the measurement AC signal output from the AC signal generation unit 42 is a known value. If the cycle of fluctuations of the fuel cell voltage VFC and the cycle of the measurement AC signal output from the AC signal generation unit 42 are within a certain range of each other, it can be determined that the noises are caused by voltage maintenance control.

In the process for measuring an insulation resistance value according to the second embodiment, the fuel cell 21 is controlled in a noise suppression mode only when it can be considered that noises superimposed on the voltage-divided AC signal are caused by the voltage maintenance control. Thus, the control of suppression of the voltage of the fuel cell 21 is not interfered with when noises, which are not caused by the control of suppression of the voltage are superimposed on the voltage-divided AC signal. This makes it possible to maintain the efficiency of generation of electric power of the fuel cell 21 and the durability thereof higher than those in the process for measuring an insulation resistance according to the first embodiment.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell system, comprising:
   a fuel cell;
   an electric power generation control unit configured to control an amount of electric power generated by the fuel cell by controlling an amount of oxidant gas and fuel gas supplied to the fuel cell;
   an insulation-resistance measurement signal generation unit configured to generate a voltage-divided AC signal obtained by dividing an amplitude of a measurement AC signal using a resistance voltage divided by an insulation resistance between an outer conductor located around a high voltage circuit including the fuel cell and the high voltage circuit, and a reference resistance having a known resistance value; and
   an insulation resistance measurement unit configured to measure a resistance value of the insulation resistance based on a peak value of the voltage-divided AC signal, wherein
   when the insulation resistance measurement unit detects, in a state where a voltage is maintained during an intermittent operation of the electric power generation control unit, an excessive noise state indicating a change in which a range of fluctuations of the peak value of the voltage-divided AC signal exceeds a predetermined allowable range of fluctuations, the insulation resistance measurement unit instructs the electric power generation control unit to change a fluctuation frequency of an output voltage of the fuel cell from a current frequency and then measures the resistance value of the insulation resistance.

2. The fuel cell system according to claim 1, wherein when the insulation resistance measurement unit detects the excessive noise state in a state where a voltage is maintained during an intermittent operation of the electric power generation control unit, the electric power generation control unit increases or reduces the fluctuation frequency of the output voltage of the fuel cell by increasing or reducing the amount of electric power generated by the fuel cell from a current level.

3. The fuel cell system according to claim 1, wherein when the insulation resistance measurement unit detects the excessive noise state in a state where a voltage is maintained during an intermittent operation of the electric power generation control unit, the electric power generation control unit changes the fluctuation frequency of the output voltage of the fuel cell from the current frequency by changing, from a current cycle, a cycle of increasing or reducing a flow rate of the oxidant gas supplied to the fuel cell.

4. The fuel cell system according to claim 1, wherein the insulation resistance measurement unit determines whether or not the excessive noise state is caused by a voltage maintenance control performed by the power generation control unit based on a noise determination cycle in which it is determined that a noise has occurred among cycles of fluctuations of the peak value of the voltage-divided AC signal, and a cycle of fluctuations of the output voltage of the fuel cell, and instructs the electric power generation control unit to change the fluctuation frequency of the output voltage of the fuel cell from the current frequency when the insulation resistance measurement unit determines that the excessive noise state is caused by the voltage maintenance control.

* * * * *